United States Patent [19]
Dollin et al.

[11] Patent Number: 6,112,236
[45] Date of Patent: *Aug. 29, 2000

[54] METHOD AND APPARATUS FOR MAKING QUALITY OF SERVICE MEASUREMENTS ON A CONNECTION ACROSS A NETWORK

[75] Inventors: Christopher James Dollin, Yate; Patrick Goldsack, Chipping Sodbury, both of United Kingdom

[73] Assignee: Hewlett–Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,668

[22] Filed: Nov. 21, 1996

[30] Foreign Application Priority Data

Jan. 29, 1996 [EP] European Pat. Off. .............. 96300604

[51] Int. Cl.$^7$ .................................................. H04L 12/26
[52] U.S. Cl. .......................... 709/224; 709/223; 709/224; 709/227; 370/14; 370/15; 370/253; 370/517; 370/519; 375/226; 375/245; 375/244
[58] Field of Search ........................ 395/200.53, 200.54, 395/500; 370/517, 519, 253, 14, 15; 375/226, 244, 245; 709/227, 223, 224

[56] References Cited

U.S. PATENT DOCUMENTS 5,521,906 5/1996 Ennis, Jr. et al. ........................ 350/17
5,793,976 8/1998 Chen et al. ........................ 395/200.54

FOREIGN PATENT DOCUMENTS

3506470A1 2/1985 Germany .

OTHER PUBLICATIONS

TRA "Telecommunication Research Associates", 1984–1998, p. 76.

International Conference on Communications, Jun. 23–26, 1991, pp. 264–268, N. Sato et al., "Performance Monitoring Method Using OAM Cells in B–ISDN".

IEEE Network, vol. 1, No. 3, Jul. 1987, pp. 40–48, D. Jacobson et al., "A Master/Slave Monitor Measurement Technique for an Operating Ethernet Network".

Hewlett–Packard Journal, vol. 44, No. 2, Apr. 1993, pp. 82–89 Matthew J. Burdick, "Continuous Monitoring of Remote Networks: The RMON MIB".

*Primary Examiner*—Glenton B. Burgess
*Assistant Examiner*—Hieu C. Le
*Attorney, Agent, or Firm*—Ohlandt, Greeley, Ruggiero & Perle, L.L.P.

[57] ABSTRACT

The quality of service provided by a connection in transferring data units (19) between first and second points (A, B) across a network (10), is measured by a method involving monitoring the normal connection traffic at the first and second points (A, B) to detect the occurrence of the same events at each point (unit 22). An event is deemed to have occurred at a monitored network point when a predetermined set of criteria concerning one or more data units is satisfied by the connection data-unit traffic at the point concerned. Whenever an event is detected, an event report or "digest" is generated (unit 25), this digest including a signature based on the contents of the data units giving rise to the event. Digests from both monitored network points (A, B) are sent to a correlation unit (30) where digests relating to the occurrence of the same event at the two network points are matched up. The matched digest pairs are then passed to a measurement unit (31) to derive quality of service measurements.

20 Claims, 6 Drawing Sheets

| LENGTH=7 | SIGNETTE 1 | SIGNETTE 2 | SIGNETTE 3 | SIGNETTE 4 | SIGNETTE 5 | SIGNETTE 6 | SIGNETTE 7 |

| LENGTH=5 | SIGNETTE 1 | SIGNETTE 2 | SIGNETTE 3 | SIGNETTE 4 | SIGNETTE 5 |

| LENGTH=3 | SIGNETTE 3 TYPE | SIGNETTE 3 VALUE | SIGNETTE 2 TYPE | SIGNETTE 2 VALUE | SIGNETTE 7 TYPE | SIGNETTE 7 VALUE |

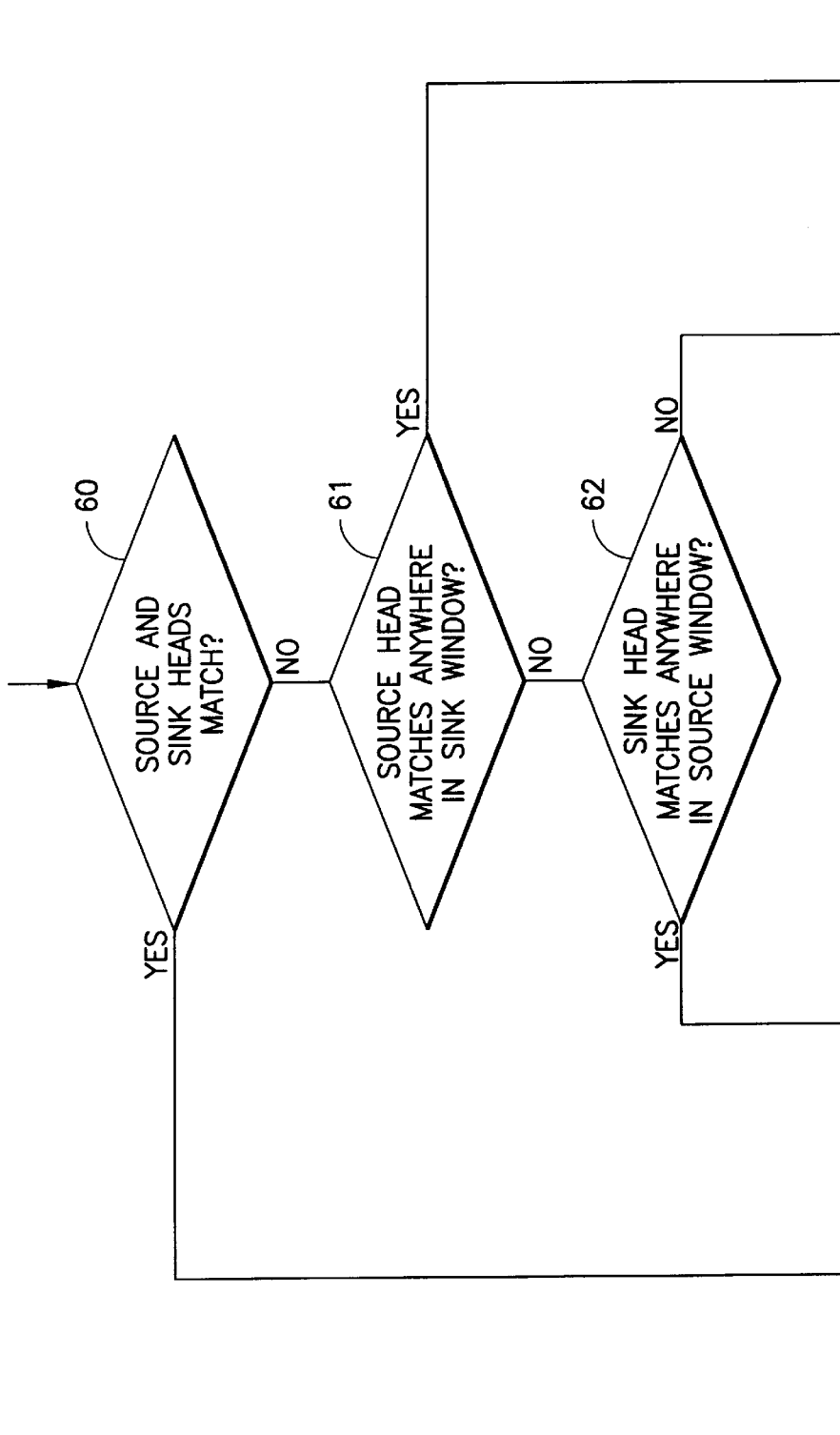

METHOD AND APPARATUS FOR MAKING QUALITY OF SERVICE MEASUREMENTS ON A CONNECTION ACROSS A NETWORK

FIELD OF THE INVENTION

The present invention relates to a method and apparatus for measuring the quality of service provided by a connection in transferring data units between first and second points across a network.

In the context of the present specification, the term "connection" refers to the general mechanism set up (of whatever form) for transferring data across the network from some given source to some given destination. The present invention has application to connections for which, at least between the first and second network points, the data being transferred is organised into a stream of data units, though this organisation need not necessarily exist at the point where the data is sourced onto the network or at the point is delivered to its destination (however, this will generally be the case). The term "data unit" as used herein refers to any recognisable structure into which data is organised. In particular, the term "data unit" includes both discrete packets, cells or frames directly appearing on a network link, and logical structures that may be transferred in the former (including by segmentation across such units) and may be at several removes of a logical structuring hierarchy from the units actually appearing on the network. However, it is expected that the present invention will find most ready application where the data units of interest are those appearing directly on a network link, such as ATM cells.

BACKGROUND OF THE INVENTION

A wide variety of transfer mechanisms are known for establishing a connection across a network. Thus a connection may involve the establishment of a physical circuit through the network, in which case data to be transferred need not be divided up into units or if it is need carry no routing or connection indicator. Alternatively, a connection may involve transferring data in data units which are individually routed along the same or different network paths (such as with TCP packets on the Internet) in which case the data units carry information about their eventual destination. Again, a connection may involve the establishment of a virtual circuit (such as in ATM) in which case the individual data units need only carry information about their next hop, the network nodes being responsible for routing and updating the units as required.

Whatever the transfer mechanism employed for a connection, a network operator such as a national PTT offers services to users on the basis of a user "purchasing" a connection across the network. The amount paid for the connection will depend on characteristics of the connection such as its bandwidth and reliability; such parameters may be generally be considered as measures of the quality of service provided by the connection. Of course, whilst the network operator may offer to provide connections with a particular quality of service, this is no guarentee that the connections actually established do indeed provide this quality of service.

Whilst the actual quality of service provided by a connection has always been a concern for a user purchasing a connection from a network operator, the coming of broadband networks has substantially increased interest in this area because of the complexities involved in defining the exact quality of service contracted for. Quality of service in this context includes agreed bandwidth and the network operator must manage the available bandwidth so that, on average, all client contracts can be met. More particularly, for broadband connections, quality of service measurements may include:

unit delay . . . the amount by which a unit has been delayed or the average by which some sequence of units has been delayed;

delay variation . . . the amount by which the unit delay varies;

unit loss . . . the proportion of units that entered the network but never left it;

unit corruption . . . the proportion of units that entered the network and left it, but whose contents had been corrupted;

burst dispersion . . . the extent to which passage through the network has changed the spacing between units, usually by delaying the end of a burst by more than the start;

peak bandwidth . . . the maximum bandwidth delivered at the network exit point;

mean bandwidth . . . the mean bandwidth delivered at the network exit point;

low bandwidth . . . the minimum bandwidth delivered at the network exit point;

The last three measures may be viewed as profiling information as they can be derived for measurements at one point (the network exit point).

It is known to make quality of service measurements on a connection by injecting special test data units at a first network point and then detecting these special test data units at a second network point. However, such an approach suffers from the drawback that the test data units will inevitably have an influence on the parameters being measured, this being particularly true if the number of test data units injected is significant. It is also difficult to intersperse the test data units with the normal traffic in a consistent manner. Furthermore, it is necessary to remove the test data units prior to them reaching the intended destination end point of the connection and this requires the use of an active probe which is both more expensive and carries higher risks for operational integrity than a passive probe.

It is an object of the invention to provide a method and apparatus for carrying out quality of service measurements on a connection across a network, that do not suffer from the above-mentioned drawbacks.

SUMMARY OF THE INVENTION

According to the present invention, there is provided apparatus for measuring the quality of service provided by a connection in transferring data units between first and second points across a network, the apparatus comprising:

respective event-capture means at each of said first and second points, each event-capture means comprising:

storage means for storing an event definition defining an event in terms of a criterion set of one or more criteria to be met by a group of at least one data unit associated with the connection of interest, the criterion sets for the two event-capture means being non mutually exclusive;

monitoring means for monitoring the network at the corresponding said point to identify data units associated with the connection and detect occurrences of an event satisfying the criterion set;

report means for generating for each detected event an event report having a signature characterisitic of that specific event, the report means comprising signature means for deriving the signature from the group of at least one data unit associated with the event concerned; the event reports from the event-capture means at said first and second points respectively forming a source report stream and a sink report stream;

correlation means for receiving the source and sink report streams and for pairing from the two streams those event reports that relate to the same the event by matching their signatures, the event reports so paired constituting matched event-report pairs; and measurement means for utilising the matched event-report pairs to derive quality of service measurements therefrom in respect of the operation of the connection between said first and second points.

The apparatus of the invention thus does not inject special test data units into the network but instead relies on tracking events in the existing traffic carried by the connection of interest.

Generally, the criterion set will either be the same for both event-capture means or one will be a major subset of the other.

Where the monitored network points are located such that they will only carry data units of the connection of interest, then the monitoring means need make no selection from the data units monitored, all such units being potentially of interest. However, generally data units from a plurality of different connections will be routed past the monitored network points and the criterion set will then comprise a criterion that said data units relate to the connection of interest. Such a criterion will generally take the form that the data units must carry a predetermined connection identifier; however, it is possible that the connection of interest may be differently identified at the two network points in which case whilst the criterion is the same for both points at a high level (the data units must relate to the same connection), it will be differently expressed at the two network points.

Other criteria of interest are, for example, time related criteria. Accordingly, each time the monitoring means receives a data unit of the connection of interest, the monitoring means preferably generates a corresponding time stamp and associates it with the data unit concerned. Advantageously, the criterion set comprise at least one of the following criteria:

a criterion based on the absolute value of a time stamp associated with a data unit, a criterion based on the relative time of receipt of at least two data units as indicated by their associated time stamps.

Generally the data units will have a plurality of bit positions and in this case, at least one criterion can advantageously be specified in terms of particular bit values at predetermined bit positions of said group of at least one data unit. The monitoring means then detects a said group as satisfying the criterion when the bit values at the predetermined bit positions of that group correspond to the particular bit values specified in the criterion.

As many quality of service measurements can be made on the basis of relative timings at the two network points, the report means preferably incorporates into the event report for a said event the time stamp of at least one data unit associated with that event and/or a time stamp corresponding to the time of occurence of that event (that is, the time at which all criteria of the criterion set are satisfied).

The report means may also incorporate into the event report for an event, information identifying the criterion set. This is particularly useful where two criterion sets are being successively or simultaneously used as it enables the correlation means to know to which successive or simultaneous measurement operation the event report belongs.

As regards the event signature incorporated into an event report, this will generally be of reduced length as compared to the combined length of the data units associated with that event; however, the signature may in certain cases be constituted by the data units in their totality. Where the signature is of reduced length, it may be formed by generating for predetermined said data units associated with the event of interest, a function of each such data unit, these functions then being combined together to form the signature of the event.

In an alternative form, the signature comprises at least one signette of known type selected from a predetermined group of possible signette types, each said signette being characteristic of the corresponding said event. With signatures of this form, the signatures produced at the two event-capture units for the same event need not be the same provided there are common signettes that can be correlated.

The correlation means will generally be remotely located with respect to the event capture means (though it could, in fact, be integrated with one of the event-capture means). The communication path between at least one of the event capture means and the correlation means may be bandwidth limited (either inherently or to avoid disrupting other traffic carried by the path). In this case, the apparatus preferably further comprises bandwidth control means for regulating the data rate of at least one of said source and sink report streams by adaptively controlling the size of the said event reports included therein in dependence on said data rate, the bandwidth control means controlling the size of said event reports by causing the corresponding said report means to alter the make up of the event reports. This adaptive control can be effected simultaneously and in the same manner for both event-capture units or each unit can be independently controllled. Where the event report normally includes one or more time stamps and/or a criterion-set identifier, one or more of these elements can be omitted to reduce the event report size (even though doing so may reduce the range of measurements possible). Whilst it will always be necessary to include a signature in each event report, the length of this signature can also be adaptively adjusted—thus, for example, where the signature is made up of signettes, the number of signettes in the signature could be adaptively varied to take account of any current bandwidth restrictions.

The task of the correlation means is to match up the event reports from the two network points, that relate to the same event; this matching is effected by matching the signatures included in the event reports. The task is complicated by the possibility of the loss, addition, repetition and corruption of data units in transit between the first and second network points. This can give rise to the loss, insertion or corruption of an event at the second network point as compared to the first and the correlation means should preferably be capable of handling such possibilities.

Thus, in relation to inserted events, the correlation means preferably comprises a source queue for queuing event reports in the source report stream; a sink queue for queuing event reports in the sink report stream; comparison means for comparing the head event report of the source queue with the first N event reports in the sink queue starting with the head entry of that queue, the comparison means upon determining a match between the head event report of the source queue and an event report in the sink queue, outputting the matched event reports as a said matched event-report pair and discarding from the sink queue any event reports ahead of the matched event report of that queue; and control means for causing repeated operation of the comparison means to service the queues. Advantageously the correlation means further comprises count means for keeping a count of the discarded event reports as a count of inserted events.

For handling lost events, the correlation means preferably comprises a source queue for queuing event reports in the source report stream; a sink queue for queuing event reports in the sink report stream; comparison means for comparing the head event report of the sink queue with the first N event reports in the source queue starting with the head entry of that queue, the comparison means upon determining a match between the head event report of the sink queue and an event report in the source queue, outputting the matched event reports as a said matched event-report pair and discarding from the source queue any event reports ahead of the matched event report of that queue; and control means for causing repeated operation of the comparison means to service the queues. Advantageously, the correlation means further comprises count means for keeping a count of the discarded event reports as a count of lost events.

With respect to corrupted events, the correlation means preferably comprises a source queue for queuing event reports in the source report stream; a sink queue for queuing event reports in the sink report stream; comparison means for comparing the head event report of each the queue with the first N event reports of the other queue, the comparison means upon determining a match outputting the matched event reports as a matched event-report pair and discarding any event reports ahead of the matched event report in the queues, and the comparison means in the absense of a match being determined, discarding the head event report of each queue; and control means for causing repeated operation of the comparison means to service the queues. Advantageously, the correlation means further comprises count means for keeping a count of the number of times no match is determined by the comparison means, this count serving as a count of corrupted events.

Preferably, the correlation means is arranged to handle inserted, lost and corrupted events with a common structure, that is, with a single source report queue, a single sink report queue and comparison means for effecting the above comparisons; typically, the comparison means is implemented by a program-controlled processor.

The measurement means performs quality of service measurements on the basis of information contained in the paired event reports in standard manner. For example, where the event reports include time stamps, statistics on network delay and burst dispersion and similar connection parameters can be readily derived. Where the correlation means keeps counts of inserted and/or lost and/or corrupted events, these counts are preferably passed to the measurement means for use in providing quality of service measurements.

According to another aspect of the present invention, there is provided a method of measuring the quality of service provided by a connection in transferring data units between first and second points across a network, the method comprising the steps of:

(a) monitoring the network at each said point to identify data units associated with the connection of interest;

(b) determining at each said point whether data units identified in step (a) at that point satisfy a predetermined criterion set of one or more criteria applicable to a group of at least one data unit associated with the connection of interest, the criterion sets for the first and second points being non mutualy exclusive and the satisfaction of the criterion set constituting an event;

(c) generating for each said event determined in (b) an event report having a signature characterisitic of that specific event, the signatures being derived from the data units associated with the corresponding events and the event reports generated for events at said first and second points respectively forming a source report stream and a sink report stream;

(d) correlating the source and sink report streams to pair those event reports that relate to the same event by matching their signatures, the event reports so paired constituting matched event-report pairs; and (e) utilising the matched event-report pairs to derive quality of service measurements therefrom in respect of the operation of the connection of interest between said first and second points.

BRIEF DESCRIPTION OF THE DRAWINGS

A method according to the invention and apparatus embodying the invention, both for carrying out quality of service measurements on a connection across a network, will now be described, by way of non-limiting example, with reference to the accompanying diagrammatic drawings, in which:

FIG. 3A is a diagram illustrating the composition of an event signature made up of signettes arranged in fixed order, this signature being of a first length;

FIG. 3B is a diagram similar to FIG. 3A but for a signature of a second length;

FIG. 4 is a diagram illustrating the composition of an event signature made up of signettes each identified as to type;

BEST MODE OF CARRYING OUT THE INVENTION

Figure 1:
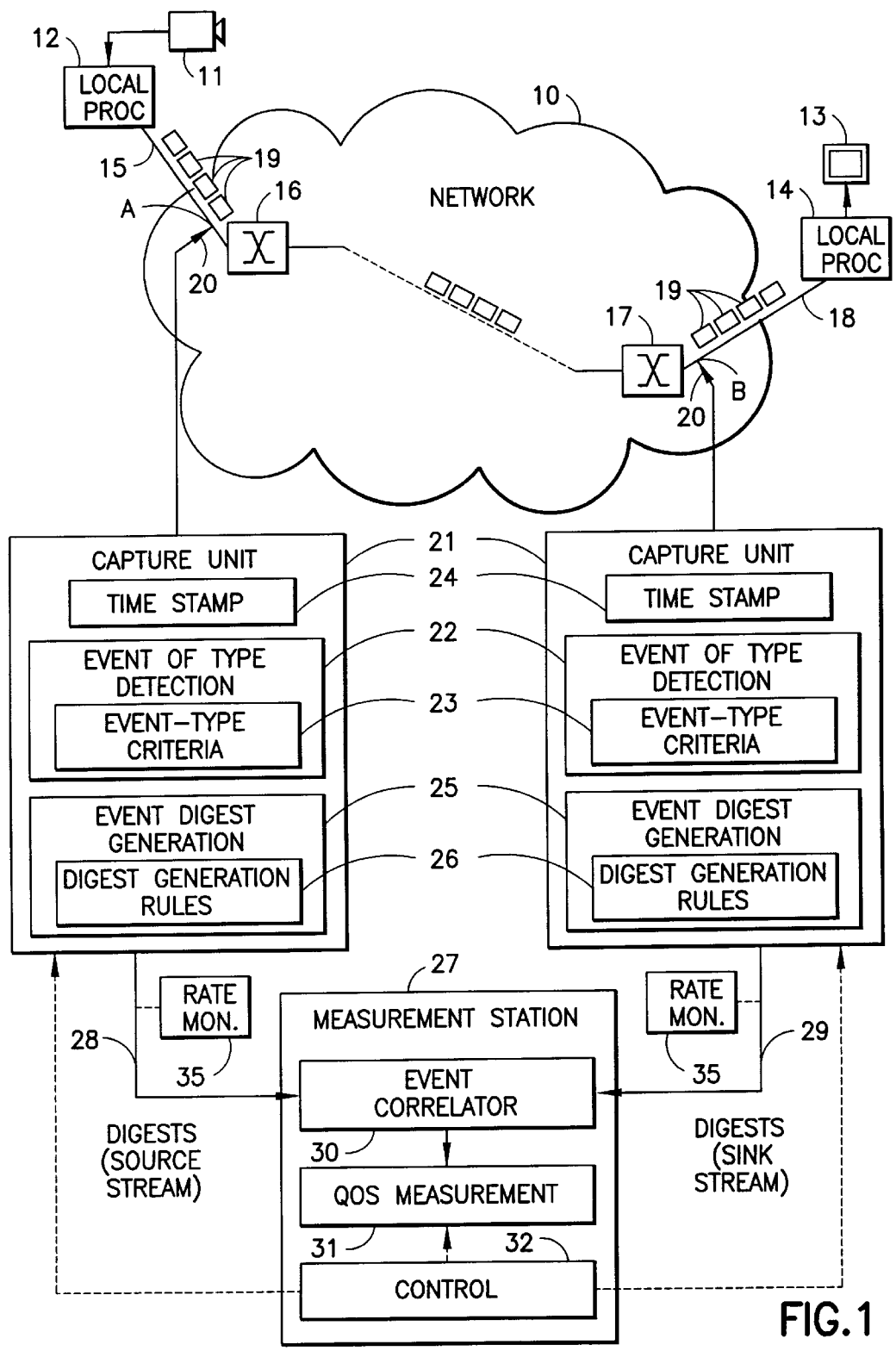
FIG. 1 is a diagram of the overall quality-of-service measurement apparatus and illustrates the monitoring of a network connection at two points by respective event-capture units that provide information back to a common measurement station.

Shown in FIG. 1 is a network 10 used to provide a connection between a data source constituted by a camera 11 and a local processing unit 12, and a remote data receiver constituted by a video monitor 13 and a local processing unit 14.

The local processing unit 12 serves to digitise the output of the camera 11 and transmit the digitised output onto link 15 as a stream of ATM (Asynchronous Transfer Mode) cells 19 of fixed size. The network 10 provides a connection between the link 15 and a link 18 connected to the local processing unit 14 associated with the monitor 14. This connection serves to transfer the ATM cells 19 placed on link 15 by unit 12, to the unit 14 and to this end a path is established through the network 10 via switches 16 and 17 and intermediate elements not illustrated in FIG. 1. In an ATM network, the network nodes (switches 16, 17) set up a connection path through the network as a succession of virtual channels between nodes. Each cell 19 carries a virtual channel identifier which a receiving node uses to route the cell along the corresponding virtual channel to the next node. The virtual channel identifier is updated at each node according to a mapping established at the time the connection is set up.

The ATM cells 19 relating to the connection established between the local processing units 12 and 14 may be mixed in transmission across the network with ATM cells associated with other connections. Indeed, links 15 and 18 may also carry cells relating to a different connection.

The apparatus of the invention is arranged to measure the quality of service provided by the network connection set up for transferring the cells 19 between the units 12 and 14. In the present example, the apparatus is connected to measure the quality of service provided by the connection between a point A on link 15 and a point B on link 18. To this end, respective passive monitoring probes 20 are connected into links 15 and 18 at points A and B.

Event-Capture Units

Each probe 20 is connected to a respective event-capture unit 21 generally co-located with the probe. The two event-capture units are substantially identical in form, each including an event-of-type detection unit 22 that serves to detect predetermined 'events' occuring at the corresponding network point A, B.

An 'event' occurs when a group of one or more cells satisfies a predetermined set of criteria defining a particular event type; this set of criteria (criterion set) comprises one or more predetermined criteria. Each event-of-type detection unit 22 includes storage means 23 for storing the set of criteria defining at least one event type; for simplicity, it will be assumed hereinafter, that only one event type is defined. The defined event type is the same at both event-capture units. The storage means 23 will generally be a memory unit storing the event-definition criteria in an explicit form but it would also be possible to store at least some of these criteria in a more implicit form such as by the hardwiring of circuitry.

Unless it is known that only cells of the connection of interest will appear at the monitored network point, the set of criteria defining an event type will include a criterion that the cell or cells involved in the defined event all relate to the connection of interest. Whilst this criterion will be the same for both event-capture units, the expression of the criterion may differ between these units, depending on how the connection of interest is identifiable at the associated network points A, B. In the present case, cells relating to the connection of interest are identifiable by the virtual channel identifier carried in the cell header. As already indicated, the virtual channel identifier changes as the cells pass from node to node over the network. However, for a given connection, once the connection is established, the virtual channels and thus the virtual channel identifiers used by the connection are fixed for each node-to-node hop. For present purposes, it is assumed that the virtual channel identifiers relevant to the connection of interest at points A and B have been ascertained (for example, by node interrogation) and can be included in the relevant criteria.

The other criteria associated with an event-type definition will depend on the nature of the quality-of-service measurement to be made. If it is simply desired to measure transit time between points A and B, then every cell associated with the connection of interest can constitute an event so that no further qualifying criteria are needed beyond connection identity. However, it may, for example, be desired to define an event in terms of the data content of a cell or of the value of particular bit positions; in this case, an appropriate criterion can be readily specified. Again, the survival across the network of trains of at least five cells may be of interest and in this case a criterion is required to the effect that five cells follow one another at the minimum inter-cell time.

In this last example, the criterion required a knowledge of the time between cells. In fact, many likely criteria will be time related (including absolute-time criteria such as the first cell received after a specified time). To permit the event-of-type detection units 22 to determine whether the monitored cells of the connection of interest meet such time-related criteria, each monitored cell is time stamped upon receipt by a timestamp unit 24.

Thus, as each cell 19 is detected at network point A/B by the corresponding probe 20, it is passed to the associated event-capture unit 21 where it is first time stamped by unit 24 and then examined by the event-of-type detection unit 23 to ascertain whether the cell gives rise to satisfaction of the stored event criteria, either itself or together with previously-detected cells, depending on the criteria. If the stored criteria are satisfied, an event of the defined type is deemed to have occured and the associated cells together with their time stamps are stored for further processing (to be described below). A time stamp corresponding to the time of occurence of the event may also be obtained from the time-stamp unit 24 and saved with the rest of the event data. Note that the time of occurence of an event may differ from its time of detection depending on how the event is defined; for example, an event of a train of five cells can only be detected after the fifth cell is received but the train may be defined as occuring at the time of receipt of the first cell of the train.

The actual processing required to determine whether the event criteria have been satisfied can be carried out in any appropriate manner though typically a program-controlled processor will be used at least for the time-related criteria. For cell bit-position value criteria, dedicated hardware can be used. It may also be useful to carry out connection identity testing on a cell as a preliminary test, since the connection identity criteria will generally be present in all event definition and early elimination of cells of no relevance will ease downstream processing.

The successive satisfaction of the event-type criteria at one network point gives rise to a succession of events each of the same type but each essentially a specific, unique, event in that the group of one or more cells associated with each event is different for each event. In contrast, the same event may occur at both network point A and at network point B, again on the basis of the cell or cells giving rise to an event being detected. A key characteristic of the present measurement method and apparatus is the correlation of the detection of the same event at the two monitored network points. To this end, for every event it detects, each event-capture unit 21, generates a corresponding event report characteristic of that event and sends this report to an event correlator 30, common to both capture units 21. The event correlator 30 then seeks to match up event reports from the two event-capture units 21 to pair those reports relating to the occurence of the same event at points A and B respectively.

The event reports are generated in each event-capture unit 21 by a digest generation unit 25. The term 'digest' is used herein synonymously with 'event report', the term 'digest' being used because generally, though not necessarily, the event report will be of reduced length as compared to the sum of all cells giving rise to the associated event. As will be more fully described below, each digest includes a 'signature' characteristic of the cell or cells giving rising to the event concerned, this signature being generated according to predetermined, programmable, rules stored in memory 26. These rules will generally be the same for both event-capture units so that the signature generated by both units will be the same for the same event.

The digests output from the event-capture unit 21 at point A form a source digest stream 28 whilst the digests output from the event-capture unit 21 at point B form a sink digest stream 29, the terms 'source' and 'sink' having reference to the direction of transit of cells 19 between points A and B.

Figure 2:
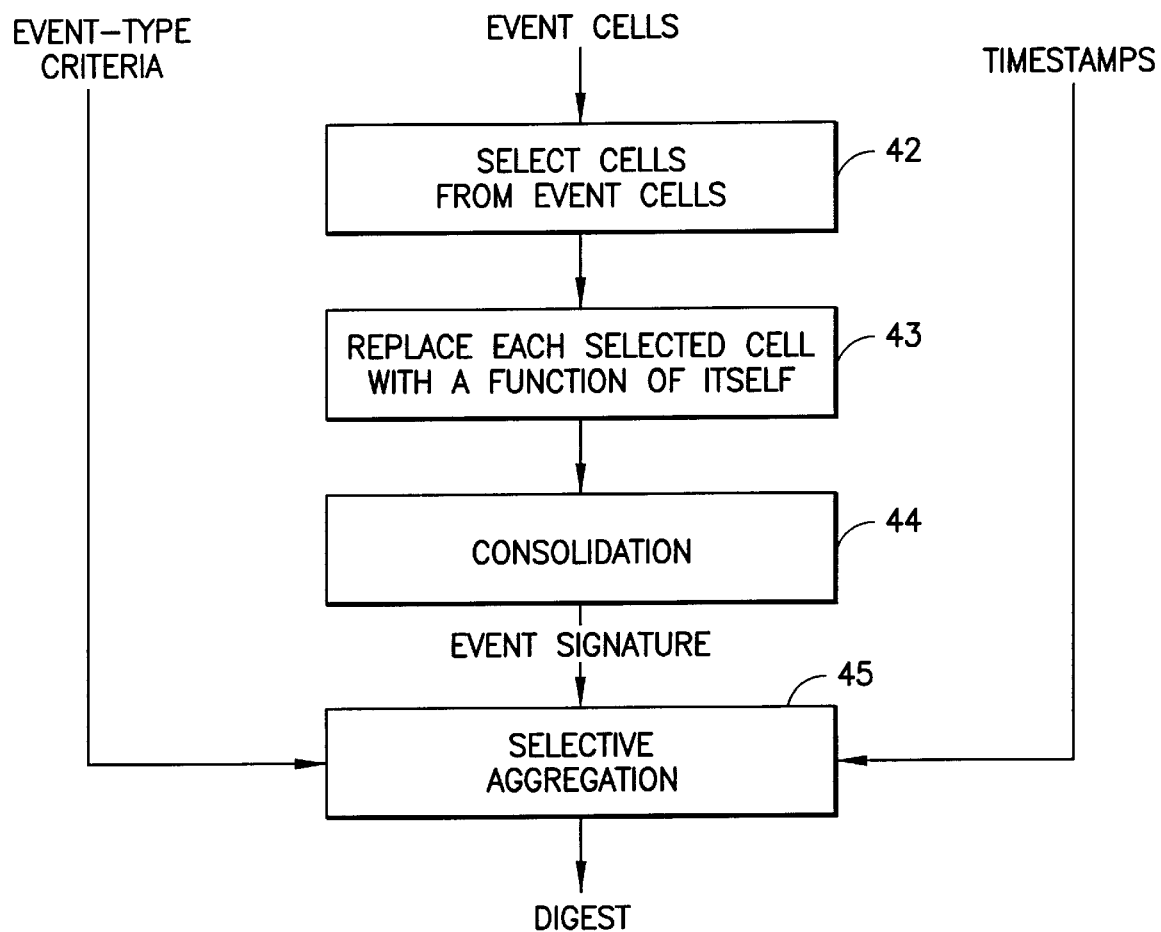
FIG. 2 is a diagram illustrating the formation of an event signature by the event-capture units of FIG. 1.

FIG. 2 illustrates the digest generation process executed by each unit 25, the latter being typically implemented as a program-controlled processor.

A digest comprises the aforesaid event signature. This signature is derived from the cell or cells giving rise to the event. One way of doing this is as follows:

Step 42—First, one or more of the cells are selected (for example, the first cell in a train of cells);
Step 43—Next, each selected cell is replaced by a function of itself. This function may simply be a mask function to select predetermined bit positions, or a more complex function such as a hashing function on the cell contents.
Step 44—Finally, the functions of the selected cells are combined in some manner, for example, by summing or exclusive-ORing, by time integration, or by simple colloquation.

Rather than the signature being unitary in nature, it can be composed of a set of one or more "signettes" of respective known types, each signette being derived independently of the other signettes and each being characteristic in its own way (but with limited specivity) of the event. Thus, for example, the following signettes may be defined:

| | |
|---|---|
| Signette type 1 | exclusive OR of all cell-content bytes; |
| Signette type 2 | crc-8 all cell-content bytes; |
| Signette type 3 | exclusive OR of alternate cell-content bytes; |
| Signette type 4 | etc . . . |

By "cell-content bytes" is meant the bytes of the non-header portion of the or each cell, or a selected such cell, giving rise to the event.

As illustrated in FIG. 3, the signature may be composed of a selected number of signettes arranged in an order that remains fixed regardless of how many signettes are present, the number of such signettes present being specified in a signature length byte. Thus, the signature 46 shown in FIG. 3A comprises seven signettes each of one signette-value byte, these signettes being of predetermined types 1 to 7; FIG. 3B shows another signature 47 formed using the same predetermined signettes types and in this case there are five signettes.

FIG. 4 shows a more flexible, but more space consuming, arrangement for a signature 48 made up of signettes. In this case, each signette is made up of a pair of bytes, namely a signette type byte followed by a signette value byte. Again, there is a signature length byte specifying the number of signettes present.

It will be appreciated that the structure and composition of a signature made up of signettes may differ from that described. Since the generation of the signettes generally requires the same cell data to be reworked several times, the signature generation process of FIG. 2 will normally require steps 42 and 43 to be repeated for each signette (though if each signette relates to a different set of bits then this may not be necessary). The advantage of using a signature made up of a plurality of signettes will be apparent hereinafter in relation to digest-stream bandwidth control.

In addition to the event signature, a digest will generally also contain one or more timestamps, such as the timestamp of one or more related cells, or the timestamp for the time of occurence of the event. Furthermore, the digest may contain an identifier of the criteria used to define the event. This latter component is useful where the event definition has just been changed and the measurement station needs to be sure of the nature of the event being reported. Another situation in which event criteria identification is useful is where two (or more) different event types are being simultaneously searched for by the units 21 (and digest matches checked for by correlator 30).

The three components (signature, timestamp, criteria identity) of a digest are then combined in step 45 to form the complete digest.

Event Correlator

The source and sink digest streams are fed to the event correlator 30 which forms part of a measurement station 27. This station will generally be conveniently located at a central location remote from the event-capture units 21 though the station could be co-located with one of the units 21. Communication between the measurement station 27 and the event-capture units 21 may be by communication links independent of the network 10 or the network 10 may be used to provide the required communication.

Upon the event correlator 30 determining that two digests, one from the source stream 28, one from the sink stream 29, both relate to the same event, the correlator outputs the matched digest pair to a quality-of-service (QoS) measurement unit 31. The digest pairing process effected by the correlator 30 is described below.

Figure 5:
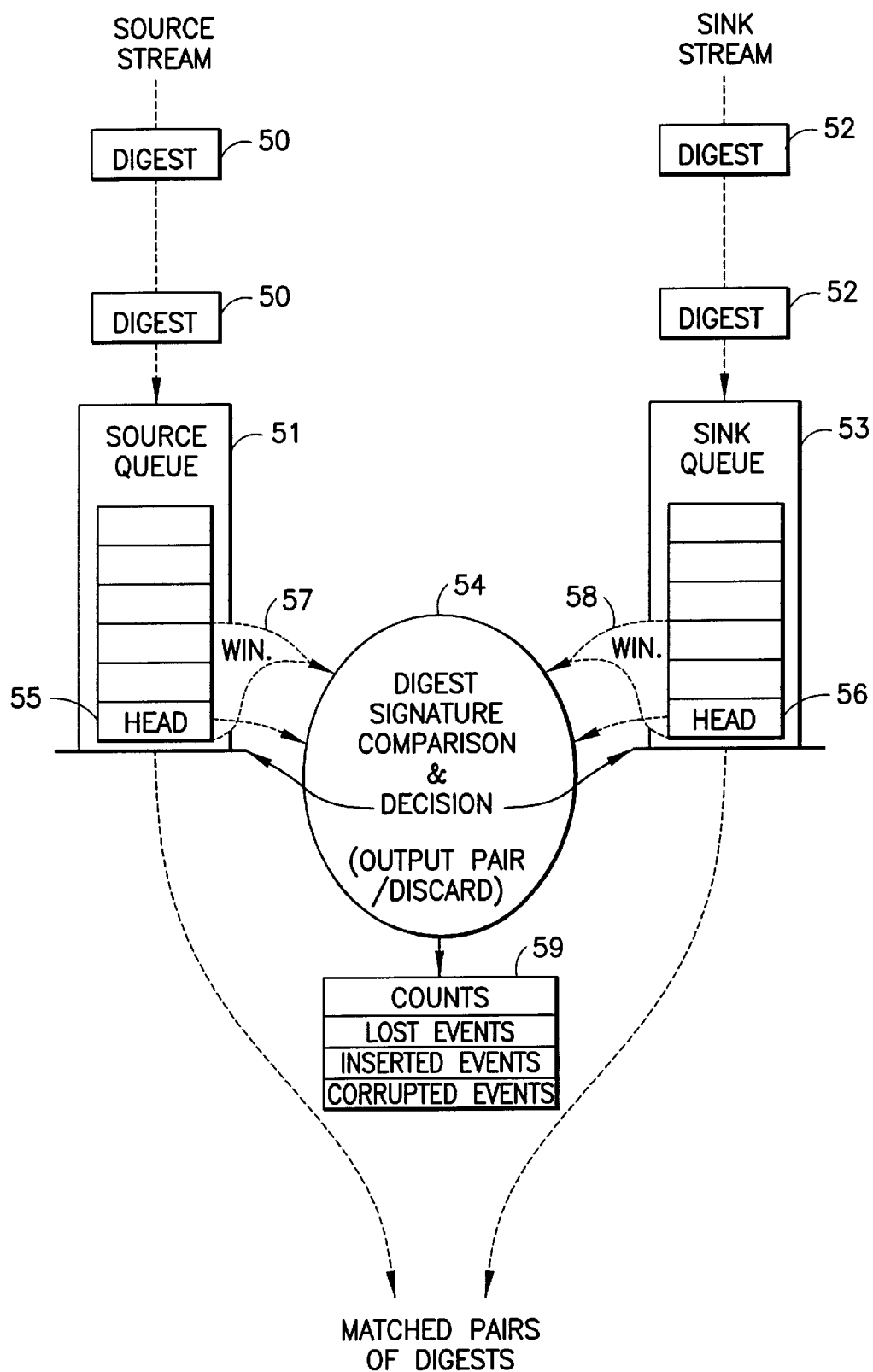
FIG. 5 is a diagram illustrating the main functional mechanisms of an event correlator of the FIG. 1 measurement station.

FIG. 5 illustrates the general mechanism implemented by the event correlator 30. Digests 50 in the source digest stream are queued in order of receipt in a source queue 51 (typically a linked list). Similarly, digests 52 in the sink digest stream are queued in order of receipt in a sink queue 53. A comparison process 54 (processor implemented) then seeks to match digests between the two queues by comparing and matching their signatures, it being assumed that digests with the same signature relate to the same event.

If the connection provided by network 10 between points A and B was perfect, then all events detected at point A would also be detected at point B and no additional events would be detected at point B. In this case, once a synchronism had been achieved between the two queues, the head entries 55 and 56 of the source and sink queues should always match and they could be output as successive matched pairs. However, in real networks the possibility exists of cell lost, corruption, repetition and insertion which in turn can lead to event insertion, loss or corruption. Event insertion corresponds to the situation where the head entry of the source queue 51 matches not with the head entry 56 of sink queue, but with say, the fifth entry of that queue, the first four entries of the sink queue having no equivalent in the source queue. Similarly, event loss corresponds to one or more entries at the front of the source queue having no equivalents in the sink queue, the head entry of this queue matching with, for example, the fifth entry of the source queue. A corrupted event will have entries appearing in both queues but these entries will not match each other or any other entry.

The comparison process 54 is arranged to look not only for expected matches but also for lost, inserted and corrupted events. However, in practise, it is necessary to place some limitations on the extent of the comparisons effected between the queues in detecting lost, inserted and corrupted events. In particular, where the head entries of the source and sink queues do not match, further comparison is limited to a window of the first N entries of each queue (the value of N may be different for each queue but it will generally be the same; for example N=3). The following informal definitions are then used:

Expected Match: head entry of source queue matches head entry of sink queue;
Inserted Event: head entry of source queue matches with one of first N entries of sink queue other than head entry;
Lost Event: head entry of sink queue matches with one of first N entries of source queue other than head entry;
Corrupted Event: head entry of source queue does not match any of first N entries of sink queue and head entry of sink queue does not match any of first N entries of source queue.

Figure 6B:
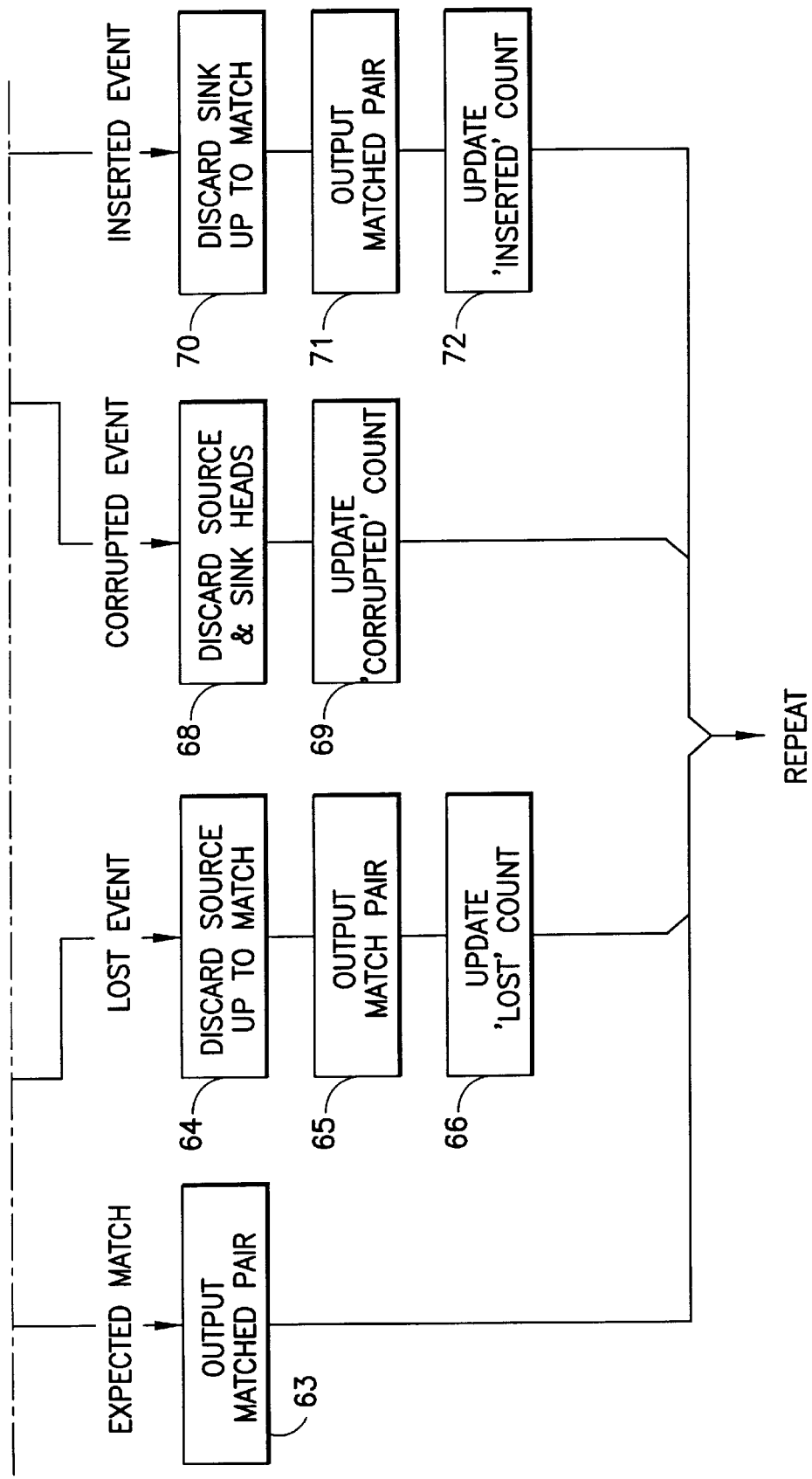
FIG. 6 is a flow chart illustrating the main processing steps executed by the event correlator of FIG. 5.

FIG. 6 is a flow chart illustrating the entry matching process. At step 60 the head entries of the source and sink queues are compared; if they match, this corresponds to an 'Expected Match' and the head entries are output as a matched pair of digests (step 63). If the head entries did not match, the head entry of the source queue is then compared in step 61 with the second, third etc entries in the sink queue until either a match is found or the limit set by the window value N is reached. If a match is found, this corresponds to an Inserted Event; the sink entries up to the matched entry are then discarded (step 70), the matched entries output as the matched digest pair (step 71), and a count of Inserted Events is updated (step 72) in correspondence to the numbers of sink entries discarded. However, if no match is found in step 61, the head entry of the sink queue is compared (step 62) with the second, third, etc entries in the source queue until either a match is found or the limit set by the window value N is reached. If a match is found, this corresponds to a Lost Event; the source entries up to the matched entry are then discarded (step 64), the matched entries output as the matched digest pair (step 65), and a count of Lost Events is updated (step 66) in correspondence to the number of source entries discarded. However, if no match is found in step 62, this corresponds to a Corrupted Event; the head entries of the source and sink queues are discarded and a count of Corrupted Events is incremented.

The outputting of the matched pairs of digests may, of course, only involve pointer adjustment rather than physical data transfer. Furthermore, if only part of each matched digest is required for subsequent processing by the QoS measurement unit 31, then only that part need be output from the corresponding queue. In this respect, often it will be possible to discard the digest signature after matching; however, this may not always be the case.

The counts of Inserted, Lost and Corrupted events are held in a count unit 59 (FIG. 5) and are periodically output to the QoS measurement unit 31.

When the correlator 30 first commences operation and prior to any matches being found, it may be appropriate to operate with a larger window size N for each queue than is subsequently used after a match has been found.

It will be appreciated that other event correlation methods are also possible.

QoS Measurement Unit

The QoS measurement unit 31 takes the information (such as time stamp data) contained in the digests and derives quality of service measures in standard manner well known to persons skilled in the art.

Changing the Criteria and Digest Rules

The measurement station 27 includes a control unit 32 by means of which the event-type criteria stored in memory 23 and the digest generation rules stored in memory 26 of each event-capture unit 21 can be changed to effect different quality of service measurements (the control connections are illustrated by dotted lines in FIG. 1).

It may be also be desirable to change the digest generation rules to reduce the size of the digests in order to reduce the data rate between the units 21 and station 27 in the case where the links carrying the digests are bandwidth limited or it is desirable not to stress the links. Thus, the digest generation rules can in appropriate circumstances be modified to omit event-type criteria identifiers and/or timestamps (even though doing so may reduce the range of measurements possible). Whilst it will always be necessary to include a signature in each digest, the length of this signature could also be adaptively adjusted—thus, for example, where the signature is made up of signettes as described above, the number of signettes in the signature could be adaptively varied to take account of any current bandwidth restrictions.

A determination that the reporting data rate from an event-capture unit 21 needs adjusting can be effected by a rate monitor unit 35 (FIG. 1) on the basis that this data rate should not, on average, exceed a predetermined threshold that may either be a fixed value or vary adaptively with the loading of the link carrying the reporting digest stream (this link may carry other traffic). Generally the strategy will be adopted that the reporting data rate should be permitted to be as high as possible within this threshold and the digest generation rules will be adaptively changed accordingly.

If the links carrying the digest streams are point to point links between the event-capture units and the measurement station, it does not matter at which end the links are monitored even where the reporting data rate threshold is adaptively varied according to the link loading. However, frequently this will not be the case and it may then be more appropriate to monitor the reporting data rate at one or other end of the link. In FIG. 1, the rate monitor units 35 are shown external to the capture units 21 and measurement station 27 so as to indicate that the units 35 may be provided in either the capture units 21 or the station 27.

In many cases, the digest generation rules will be simultaneously changed for both event capture units. Thus where the reporting data rate of one digest stream reaches its threshold, this is reported by the corresponding unit 35 to the control unit 32 which determines the new digest generation rules to be applied (to give shorter digests) and then instructs both event-capture units 21 accordingly. Similarly, where a rate monitor unit 35 determines that its monitored reporting data rate has fallen below the threshold to an extent permitting an increase in digest length, this is reported to the control unit 32; if both rate monitor units 35 have so reported, the unit 32 then determines the new digest generation rules to be used (to give fuller digests) and instructs both event-capture units to use these new rules.

Rather than having the control unit 32 control the simultaneous change of the digest adaption rules for both capture units, in appropriate circumstance the current rules applied by each unit can be independently changed. In such cases, each rate monitor unit 35 can advantageously be included in the corresponding event-capture unit with each event digest generation unit 25 then being made responsible for changing the rules it applies according to the output of its associated unit 35. For this approach to work, it is necessary for the two units 25 to use the same rule-change algorithm (that is, modify the digest generation rules in the same way at each change) and, in addition, either:

(a) the rules changes occur at approximately the same time because the thresholds are the same (or, where a load-adaptive threshold is used, are likely to be similar because of similar traffic loadings), it being assumed that the number of events to be reported, and thus the reporting data rate, will be approximately the same for both digest streams; or
(b) where different digest generation rules are applied by each unit 25, these rules give rise to compatible digests, that is, digests having signatures that can be matched for the same event.

Situation (b) can be achieved where the digest change does not affect the signature. It can also be achieved in the case where the signature is composed of signettes as described above since should the digest signatures in the source and sink digest streams be composed of different numbers of signettes because different digest generation rules are being applied by the two units 25, it is still possible for the correlator 30 to match signatures by examining only the signettes present in both signatures being compared. Obviously, the smaller the number of signettes being compared, the greater the possibility of a false match being made. However, the advantage offered by having the units independently adapt their digest generation rules (including by signature modification) without thereby preventing signature matching, is considered to outweigh the slight increase in the possibility of a false match.

Variants

In the foregoing description, it has been assumed that both event-capture units operate with the same event-type criteria so that ideally the set of events reported by each unit will be identical. In fact, this is not essential, though generally preferred. In certain circumstances it may be desired to use sets of criteria that are not identical but have substantial areas of overlap (in the sense that they are non mutually exclusive with a substantial number of the events satisfying one set of criteria also satisfying the other set of criteria). By way of example, consider four event-capture units ECU_1 to ECU_4 situated at different points on a network and arranged to detect events specified in terms of the value of a field X of data units of a particular connection, the specified values of field X being as follows:

| | |
|---|---|
| ECU_1 | Field X = 16 or 17; |
| ECU_2 | Field X = 17 or 18; |
| ECU_3 | Field X = 18; |
| ECU_4 | Field X = 16. |

The criterion set of ECU_1 and ECU_2 overlap whereas the criterion set of ECU_3 is a subset of that of ECU_2 and the criterion set of ECU_4 is a subset of ECU_1. By matching signatures of the events reported by ECU_1 and ECU_2, events with a value "17" of field X can be monitored between the network points at which ECU_1 and ECU_2 are located. Similarly, by matching signatures of the events reported by ECU_1 and ECU_4, events with a value "16" of field X can be monitored between the network points at which ECU_1 and ECU_4 are located. Again, by matching signatures of the events reported by ECU_2 and ECU_3, events with a value "18" of field X can be monitored between the network points at which ECU_2 and ECU_3 are located. In this manner, three measurements across the network are achieved using only four event-capture units. Of course, with such an arrangement one or both of the digest streams fed to the event correlator tasked with matching events having a particular value of field X, will contain inherently unwanted event digests that must be discarded. In order to take account of this, the size of the window used in the event correlation process described above will need to be appropriately sized. It will appreciated that the foregoing example is given by way of illustration and has been intentionally kept simple to facilitate understanding of the principle that the criterion sets need not be identical at each event-capture unit.

Although the present invention has been described above in relation to a connection for transferring ATM cells across a network, as already noted in the introductory portion of the present specification, the invention is equally applicable to other types of connection and data unit (including SDH units) even though subject to possible multiplexing/mixing with units from other streams. In particular, the term "data unit" includes both discrete packets, cells or frames directly appearing on a network link, and logical structures that may be transferred in the former (including by segmentation across such units) and may be at several removes of a logical structuring hierarchy from the units actually appearing on the network. In these latter cases, the event-capture units will need to be able to reconstruct the logical data units of interest from the traffic units appearing directly on the network.

It may also be noted that frequently a hierarchy of connections is involved in the transfer of data from an original source to a final destination, with connections lower in the hierarchy extending more of the way between the original source and final destination and with different ones of these connections generally involving different types of traffic units. Thus, in a simple example, a stream of ATM cells placed on a network may be transferred to a specified destination by a connection that involves packing the ATM cells into SDH frames for a leg of the journey across the network. In this case, as well as the connection involving the transfer of traffic units in the form of ATM cells between a specified source and destination, there is a connection involved in transporting the ATM cells over the aforesaid leg of the network, this latter connection working with SDH frames as its traffic units to be transferred across the network. The performance of both connections are of interest though the performance of the SDH connection will probably only be of specific interest to the network operator whereas the user who required the ATM connection will be primarily interested in the performance of the overall ATM connection (the performance of the latter will, of course, be influenced by the performance of the SDH connection). The present invention is applicable to quality of service measurements for both of the foregoing connections.

Finally, it should be noted that the traffic units appearing on the network at the two monitored points may be of different types and it is up to the event-capture unit to extract the data units of interest.

What is claimed is:

1. Apparatus for measuring the quality of service provided by a connection in transferring data units between first and second points across a network, said apparatus comprising:

respective event-capture means at each of said first and second points, each event-capture means comprising:

storage means for storing an event definition defining an event in terms of a criterion set of one or more criteria to be met by a group of said data units passing in a common direction across said connection, at least one said criteria relating to an interrelationship between at least two said data units of said group, which interrelationship is observable at the event capture means, and said criterion set for each of said event-capture means being non mutually exclusive;

monitoring means for monitoring the network at the corresponding said point to identify data units associated with said connection and detect occurrences of a said event satisfying said criterion set;

report means for generating for each detected event an event report having a signature-characteristic of that specific event, the report means comprising signature means for deriving said signature from the said group of at least one said data unit associated with the event concerned; the event reports from said event-capture means at said first and second points respectively forming a source report stream and a sink report stream;

correlation means for receiving said source and sink report streams and for pairing from the two streams those event reports that relate to the same said event by matching their signatures, the event reports so paired constituting matched event-report pairs; and measurement means for utilising said matched event-report pairs to derive quality of service measurements therefrom in respect of the operation of said connection between said first and second points.

2. Apparatus according to claim 1, wherein each time said monitoring means receives a said data unit of said connection, the monitoring means generates a corresponding time stamp and associates it with the data unit concerned, said criterion set comprising a criterion based on the relative time of receipt of at least two said data units as indicated by their associated time stamps.

3. Apparatus according to claim 1, wherein said monitoring means includes event time stamp means operative each time a said event is detected by said monitoring means to generate a time stamp corresponding to the time of occurrence of that event, said report means incorporating such time stamp in the event report for the said event.

4. Apparatus according to claim 1, wherein said signature means comprises means for generating for predetermined said data units associated with a said event, a function of each such data unit; and means for combining together said functions to form the signature of the event.

5. Apparatus for measuring the quality of service provided by a connection in transferring data units between first and second points across a network, said apparatus comprising:

respective event-capture means at each of said first and second points, each event-capture means comprising:

storage means for storing an event definition defining an event in terms of a criterion set of one or more criteria to be met by a group of data units passing in a common direction across said connection, said criterion set for each of said event-capture means differing from each other but being non mutually exclusive;

monitoring means for monitoring the network at the corresponding said point to identify data units associated with said connection and detect occurrences of a said event satisfying said criterion set;

report means for generating for each detected event an event report having a signature characteristic of that specific event, the report means comprising signature means for deriving said signature from the said group of at least one said data unit associated with the event concerned; the event reports from said event-capture means at said first and second points respectively forming a source report stream and a sink report stream;

correlation means for receiving said source and sink report streams and for pairing from the two streams those event reports that relate to the same said event by matching their signatures, the event reports so paired constituting matched event-report pairs; and measurement means for utilising said matched event-report pairs to derive quality of service measurements therefrom in respect of the operation of said connection between said first and second points.

6. Apparatus according to claim 5, where the criterion sets of the two said event-capture means are such that events falling within the event definition of one said event capture means constitute a subset of events falling within the event definition of the other said event capture means.

7. Apparatus for measuring the quality of service provided by a connection in transferring data units between first and second points across a network, said apparatus comprising:

respective event-capture means at each of said first and second points, each event-capture means comprising:

storage means for storing an event definition defining an event in terms of a criterion set of one or more criteria to be met by a group of data units passing in a common direction across said connection, at least one said criteria relating to an inter-relationship between at least two said data units of said group, which interrelationship is observable at the event capture means, said criterion set for each of said event-capture means being non mutually exclusive;

monitoring means for monitoring the network at the corresponding said point to identify data units associated with said connection and detect occurrences of a said event satisfying said criterion set;

report means for generating for each detected event an event report having a signature characteristic of that specific event, the report means comprising signature means for deriving said signature from the said group of at least one said data unit associated with the event concerned; the event reports from said event-capture means at said first and second points respectively forming a source report stream and a sink report stream; and means for generating a criterion-set identifier for identifying a current said criterion set, said report means being operative to incorporate said criterion-set identifier into the event report for a said event;

correlation means for receiving said source and sink report streams and for pairing from the two streams those event reports that relate to the same said event by matching their signatures, the event reports so paired constituting matched event-report pairs; and measurement means for utilising said matched event-report pairs to derive quality of service measurements therefrom in respect of the operation of said connection between said first and second points.

8. Apparatus for measuring the quality of service provided by a connection in transferring data units between first and second points across a network, said apparatus comprising:

respective event-capture means at each of said first and second points, each event-capture means comprising:

storage means for storing an event definition defining an event in terms of a criterion set of one or more criteria to be met by a group of at least one said data unit associated with said connection, said criterion set for each of said event-capture means being non mutually exclusive;

monitoring means for monitoring the network at the corresponding said point to identify data units associated with said connection and detect occurrences of a said event satisfying said criterion set;

report means for generating for each detected event an event report having a signature characteristic of that specific event, the report means comprising signature means for deriving said signature from the said group of at least one said data unit associated with the event concerned; the event reports from said event-capture means at said first and second points respectively forming a source report stream and a sink report stream; and wherein said signature means comprises means for generating at least one signette of known type selected from a predetermined group of possible signette types, each said signette being characteristic of the corresponding said event, and means for forming a said signature from said at least one signette in a manner enabling the type of the or each signette included in the signature to be identified by said correlation means;

correlation means for receiving said source and sink report streams and for pairing from the two streams those event reports that relate to the same said event by matching their signatures, the event reports so paired constituting matched event-report pairs; and measurement means for utilising said matched event-report pairs to derive quality of service measurements therefrom in respect of the operation of said connection between said first and second points.

9. Apparatus for measuring the quality of service provided by a connection in transferring data units between first and second points across a network, said apparatus comprising:

respective event-capture means at each of said first and second points, each event-capture means comprising:

storage means for storing an event definition defining an event in terms of a criterion set of one or more criteria to be met by a group of data units passing in a common direction across said connection, at least one said criteria relating to an inter-relationship between at least two said data units of said group, which interrelationship is observable at the event capture means, said criterion set for each of said event-capture means being non mutually exclusive;

monitoring means for monitoring the network at the corresponding said point to identify data units associated with said connection and detect occurrences of a said event satisfying said criterion set;

report means for generating for each detected event an event report having a signature characteristic of that specific event, the report means comprising signature means for deriving said signature from the said group of at least one said data unit associated with the event concerned; the event reports from said event-capture means at said first and second points respectively forming a source report stream and a sink report stream; and correlation means for receiving said source and sink report streams and for pairing from the two streams those event reports that relate to the same said event by matching their signatures, the event reports so paired constituting matched event-report pairs;

bandwidth control means for regulating the data rate of at least one of said source and sink report streams by adaptively controlling the size of the said event reports included therein in dependence on said data rate, the bandwidth control means controlling the size of said event reports by causing the corresponding said report means to alter the make up of the event reports; and measurement means for utilising said matched event-report pairs to derive quality of service measurements therefrom in respect of the operation of said connection between said first and second points.

10. Apparatus according to claim 9, wherein said bandwidth control means is responsive to the data rate of at least one said source and sink report streams to cause the report means of both said event-capture units to correspondingly and simultaneously change the size of the event reports generated thereby.

11. Apparatus according to claim 10, wherein each said event-capture means includes timestamp means for generating a timestamp relating to the time of occurrence of a said event or of a said data unit associated with that event, and means for generating a criterion-set identifier for identifying a current said criterion set; said report means including, in addition to said signature means, combining means for forming a said event report from said signature, timestamp and criterion-set identifier; said combining means of both said event-capture units being correspondingly and simultaneously controlled by said bandwidth control means to selectively exclude at least one of said timestamp and said criterion-set identifier from said event reports.

12. Apparatus according to claim 10, wherein said bandwidth control means is operative to cause the signature means of both said event capture units to correspondingly and simultaneously change the length of the signatures generated thereby.

13. Apparatus according to claim 9, wherein said bandwidth control means comprises respective bandwidth control units in each said event-capture means; each bandwidth control unit being operative to adaptively control the size of the event reports generated by the reports means of the same event-capture unit in dependence on the date rate of the corresponding one of said source and sink report streams output thereby.

14. Apparatus according to claim 13, wherein each said event-capture means includes timestamp means for generating a timestamp relating to the time of occurrence of a said event or of a said data unit associated with that event, and means for generating a criterion-set identifier for identifying a current said criterion set; said report means including, in addition to said signature means, combining means for forming a said event report from said signature, timestamp and criterion-set identifier; each said combining means being controlled by the bandwidth control unit of the same event-capture unit to selectively exclude at least one of said timestamp and said criterion-set identifier from said event reports.

15. Apparatus according to claim 13, wherein each said bandwidth control unit is operative to cause the signature means of the same event capture unit to change the length of the signatures generated thereby.

16. Apparatus according to claim 15, wherein each signature is made up of at least one signette of known type selected from a predetermined group of possible signette types, each said signette being characteristic of the corresponding said event, said bandwidth control unit controlling said signature means to vary the number of signettes making up a said signature, and said correlation means attempting to match signatures by comparing signettes of the same type contained in the signatures concerned.

17. Apparatus for measuring the quality of service provided by a connection in transferring data units between first and second points across a network, said apparatus comprising:

respective event-capture means at each of said first and second points, each event-capture means comprising:
storage means for storing an event definition defining an event in terms of a criterion set of one or more criteria to be met by a group of at least one said data unit associated with said connection, said criterion set for each of said event-capture means being non mutually exclusive;
monitoring means for monitoring the network at the corresponding said point to identify data units associated with said connection and detect occurrences of a said event satisfying said criterion set;
report means for generating for each detected event an event report having a signature characteristic of that specific event, the report means comprising signature means for deriving said signature from the said group of at least one said data unit associated with the event concerned; the event reports from said event-capture means at said first and second points respectively forming a source report stream and a sink report stream; and correlation means for receiving said source and sink report streams and for pairing from the two streams those event reports that relate to the same said event by matching their signatures, the event reports so paired constituting matched event-report pairs, said correlation means comprising:
a source queue for queuing event reports in said source report stream;
a sink queue for queuing event reports in said sink report stream;
comparison means for comparing the head event report of the source queue with the first N event reports in the sink queue starting with the head entry of that queue; said comparison means upon determining a match between said head event report of the source queue and a said event report in said sink queue, outputting the matched event reports as a said matched event-report pair and discarding from said sink queue any event reports ahead of the matched event report of that queue; and
control means for causing repeated operation of said comparison means to service said queues; and measurement means for utilising said matched event-report pairs to derive quality of service measurements therefrom in respect of the operation of said connection between said first and second points.

18. Apparatus according to claim 17, wherein said correlation means further comprises count means for keeping a count of the discarded event reports as a count of inserted events.

19. Apparatus for measuring the quality of service provided by a connection in transferring data units between first and second points across a network, said apparatus comprising:

respective event-capture means at each of said first and second points, each event-capture means comprising:
storage means for storing an event definition defining an event in terms of a criterion set of one or more criteria to be met by a group of at least one said data unit associated with said connection, said criterion set for each of said event-capture means being non mutually exclusive;
monitoring means for monitoring the network at the corresponding said point to identify data units associated with said connection and detect occurrences of a said event satisfying said criterion set;
report means for generating for each detected event an event report having a signature characteristic of that specific event, the report means comprising signature means for deriving said signature from the said group of at least one said data unit associated with the event concerned; the event reports from said event-capture means at said first and second points respectively forming a source report stream and a sink report stream; and correlation means for receiving said source and sink report streams and for pairing from the two streams those event reports that relate to the same said event by matching their signatures, the event reports so paired constituting matched event-report pairs, said correlation means further comprising:
a source queue for queuing event reports in said source report stream;
a sink queue for queuing event reports in said sink report stream;
comparison means for comparing the head event report of the sink queue with the first N event reports in the source queue starting with the head entry of that queue, said comparison means upon determining a match between said head event report of the sink queue and a said event report in said source queue, outputting the matched event reports as a said matched event-report pair and discarding from the source queue any event reports ahead of the matched event report of that queue; and
control means for causing repeated operation of said comparison means to service said queues; and measurement means for utilising said matched event-report pairs to derive quality of service measurements therefrom in respect of the operation of said connection between said first and second points.

20. Apparatus according to claim 19, wherein said correlation means further comprises count means for keeping a count of the discarded event reports as a count of lost events.

* * * * *